United States Patent
Stuessel et al.

(10) Patent No.: US 10,871,162 B2
(45) Date of Patent: *Dec. 22, 2020

(54) ELECTRICALLY ISOLATED MILK PUMP

(71) Applicant: GEA Farm Technologies, Inc., Naperville, IL (US)

(72) Inventors: Matthew J. Stuessel, Alma Center, WI (US); Jeffrey S. Hanson, Melrose, WI (US); Kevin L. Torgerson, Holmen, WI (US); Duane F. Sellner, Winona, MN (US)

(73) Assignee: GEA Farm Technologies, Inc., Naperville, IL (US)

( * ) Notice: Subject to any disclaimer, the term of this patent is extended or adjusted under 35 U.S.C. 154(b) by 507 days.

This patent is subject to a terminal disclaimer.

(21) Appl. No.: 15/693,851

(22) Filed: Sep. 1, 2017

(65) Prior Publication Data
US 2017/0363087 A1 Dec. 21, 2017

Related U.S. Application Data

(63) Continuation of application No. 12/924,201, filed on Sep. 22, 2010, now Pat. No. 9,765,785.

(51) Int. Cl.
| | |
|---|---|
| *A01K 1/12* | (2006.01) |
| *F04D 13/02* | (2006.01) |
| *A01J 7/00* | (2006.01) |

(52) U.S. Cl.
CPC .............. *F04D 13/02* (2013.01); *A01J 7/00* (2013.01); *A01K 1/12* (2013.01)

(58) Field of Classification Search
CPC . A01K 1/12; F04B 17/00; F04B 17/03; F04D 29/126; F04D 13/02; A01J 7/00
See application file for complete search history.

(56) References Cited

U.S. PATENT DOCUMENTS

| | | | | |
|---|---|---|---|---|
| 3,594,102 | A | * | 7/1971 | Oden ................... F04D 29/126 417/423.11 |
| 3,966,363 | A | * | 6/1976 | Rowley ................. F04D 13/06 417/423.11 |
| 4,304,532 | A | | 12/1981 | McCoy |
| 4,355,595 | A | | 10/1982 | Ackerman et al. |
| 2006/0222537 | A1 | | 10/2006 | Kilty |

* cited by examiner

*Primary Examiner* — Thanh Pham
(74) *Attorney, Agent, or Firm* — Smith Law Office; Jeffry W. Smith

(57) ABSTRACT

A milk pump that is connected to, but electrically isolated from dairy lines, pipes, and other electrically conductive components using insulators in the milk pump between a motor and a pump.

13 Claims, 10 Drawing Sheets

ELECTRICALLY ISOLATED MILK PUMP

CROSS REFERENCE TO RELATED APPLICATION

This application is a continuation of U.S. application Ser. No. 12/924,201 filed Sep. 22, 2010, the disclosure of which is herein incorporated by reference in its entirety.

FIELD AND BACKGROUND OF THE INVENTION

The invention relates to dairy harvesting facility milk pumps, and more particularly to electrically insulated milk pumps.

In dairy harvesting facilities, electrical equipment and structures must be electrically insulated from other equipment, operators and animals to minimize and/or avoid electrical shock, stray voltage and other problems. Insulating electrical equipment is sometimes difficult even in well designed and constructed dairies.

For example, stray voltage can occur with a grounded-neutral wiring system on a dairy harvesting facility. If stray voltage reaches sufficient levels, electric shocks can be transmitted to operators and animals when contacting grounded devices. A number of remedies can be used to reduce stray voltage, and installing an equipotential plane is one of them. An equipotential plane is an electrically conductive grid usually embedded in concrete and connected to the electrical grounding system. From a human safety standpoint the equipotential ground "cow ground" and the equipment ground "milk pump ground," are tied together in a properly installed facility at the point where electricity enters the facility. This means in a normal installation (before a failure occurs) there should be no difference in potential (voltage) between the two.

Problems also arise in connections between conducting materials that significantly impede current flow and can place an equipotential plane at a high potential with respect to earth. High impedance connections between metallic members subject to large amounts of current due to power system faults can be extremely hazardous to personnel and equipment. Most types of equipment include suitable protection against current flowing from the electrical equipment to operators and dairy animals in event of ground or neutral failure in the equipment.

An exception to this appears to be in milk pumps used to transfer milk through various pipelines and treatment devices (such as pasteurizers) in dairy harvesting facilities. Milk pumps include an electric motor and a pump driven by the motor. Current milk pump designs do not protect animals from electrical shock if the electrical circuit to the motor fails due to incorrect wiring, worn insulation, mechanical damage, or voltage surges. It is possible for stray electrical current to pass from the motor frame to the metal components of the milk pump and the stainless steel milk lines used to carry milk from the cow to the milk collection receiver and the milk cooling tank. This has the potential to harm animals and operators who are in contact with these dairy system components.

Current installation guidelines require that animals and operators be protected from stray currents by installing equipotential planes connected to dairy milk lines. Nonetheless, milk pumps are mechanically driven by electric motors, so a potential stray current could pass to the milk line because of its connection to the equipotential plane.

Most dairy equipment is designed to impede current flow and meet the installation guidelines, but milk pumps have long been neglected as a source of electrical current despite the well known possibility of stray voltage and electric shock. Thus, there are needed apparatus and methods to electrically insulate milk pumps from operators, animals, and dairy facility equipment.

SUMMARY OF THE INVENTION

The present invention is directed to a milk pump that is connected to, but electrically isolated from dairy lines, pipes, and other electrically conductive components.

A milk transfer pump in accordance with the present invention electrically isolates the ground and fault currents between the milk pump motor's electric circuit and the equipotential plane and dairy animals. This is critical in all dairy installations and in particular, automatic milking systems in which robotic milking equipment is used. The invention isolates the milk pump motor from the milk pump and all related milk lines by incorporating electrical insulating components into the milk pump assembly.

A milk pump in accordance with the invention includes a motor; a motor housing; a pump housing joined to the motor housing via electrically insulating connectors; and an impeller in the pump housing and driven by the motor with an electrically insulating power transfer shaft component. Further, specific locations, sizes, materials and shapes of the electrically insulating components are considered in the present invention.

In the present invention, the milk pump impeller is isolated from the electric motor by incorporating an electrical isolation assembly that fits onto the motor output shaft. An impeller shaft connected to the impeller and a milk seal can be separated from a motor output shaft hub with an isolation plate. Isolation bushings for connectors maintain the electrical separation between adjacent components.

The milk pump housing is also preferably insulated from the electric motor by a nonconductive spacer. The pump housing can then be joined to the motor housing with connectors such as threaded studs around which isolation bushings can be positioned to maintain electrical separation. Relative positions of milk pump components are maintained for optimal performance by machining or molding the connectors and bushings and using appropriate fasteners.

Also in accordance with the present invention, a kit is provided to retrofit existing milk pumps with electrical isolation components rather than replacing them with new pumps incorporating the invention.

DETAILED DESCRIPTION OF THE INVENTION

Figure 1:
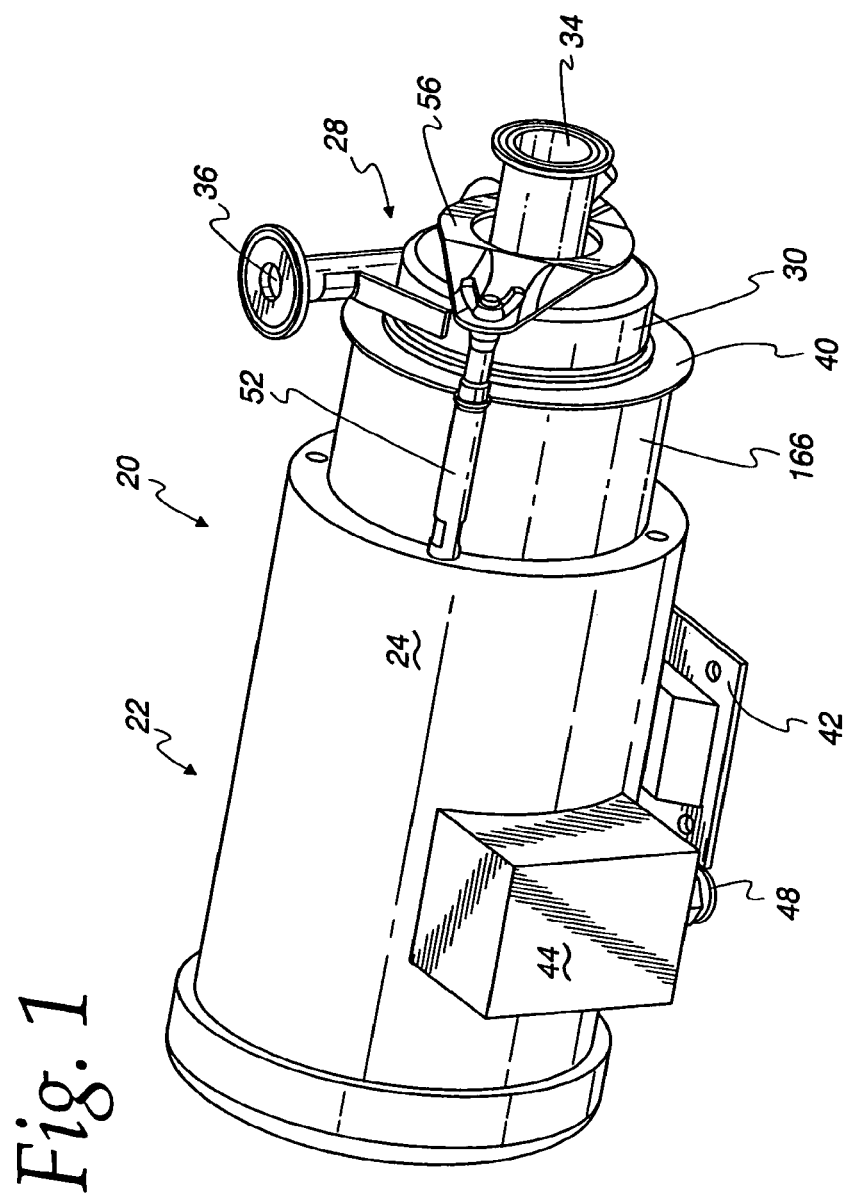
FIG. 1 is a perspective view of an electrically isolated milk pump in accordance with the present invention.
Figure 2:
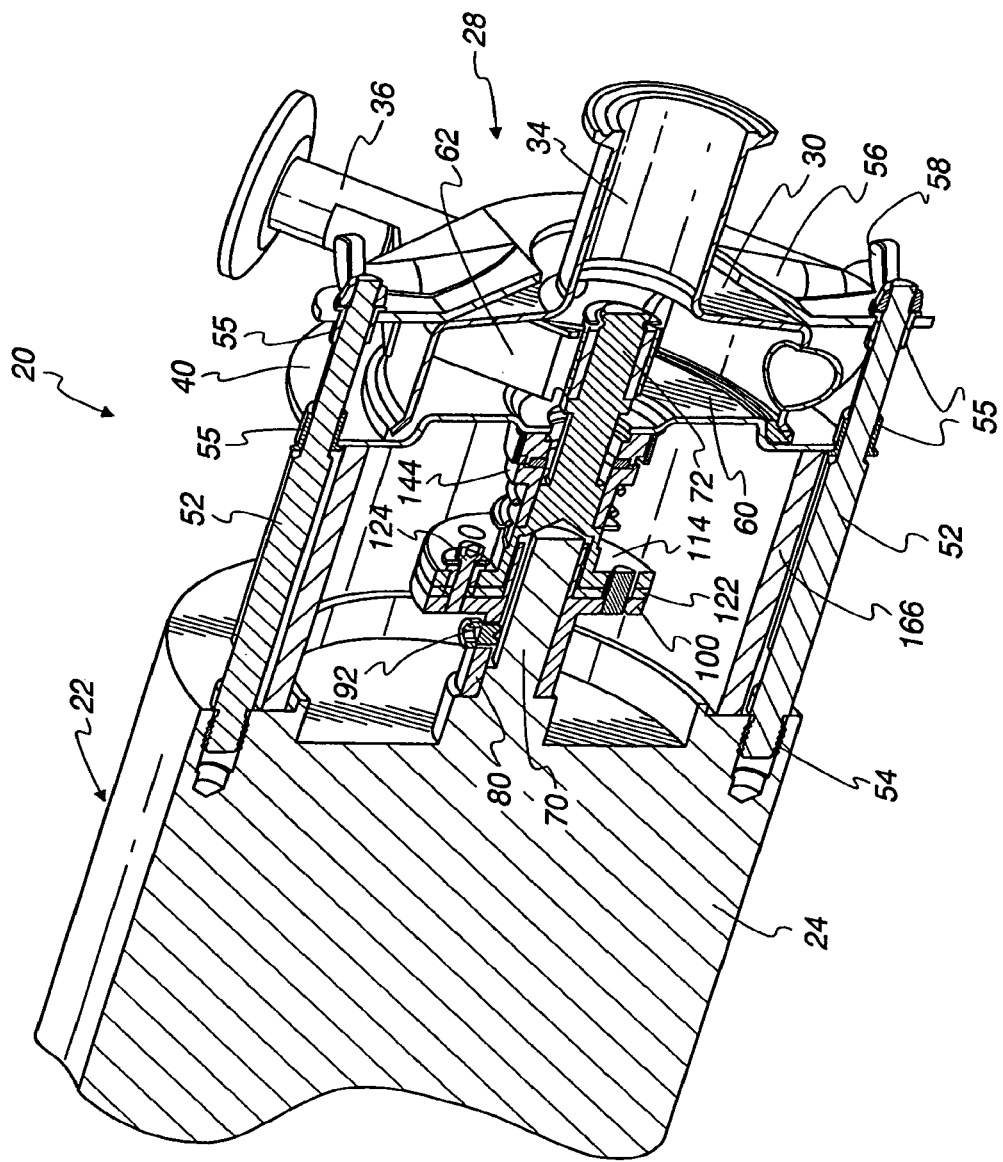
FIG. 2 is a perspective and partial cross-sectional view of the milk pump.
Figure 3:
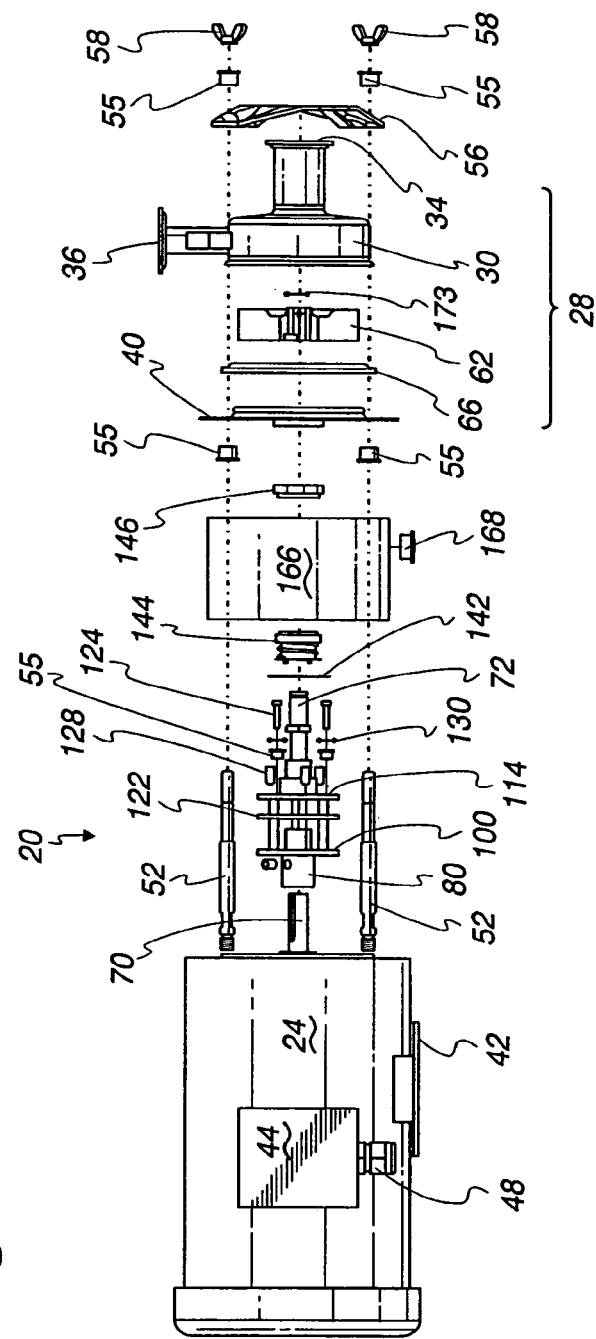
FIG. 3 is an exploded view of the milk pump of FIG. 1.
Figure 4:
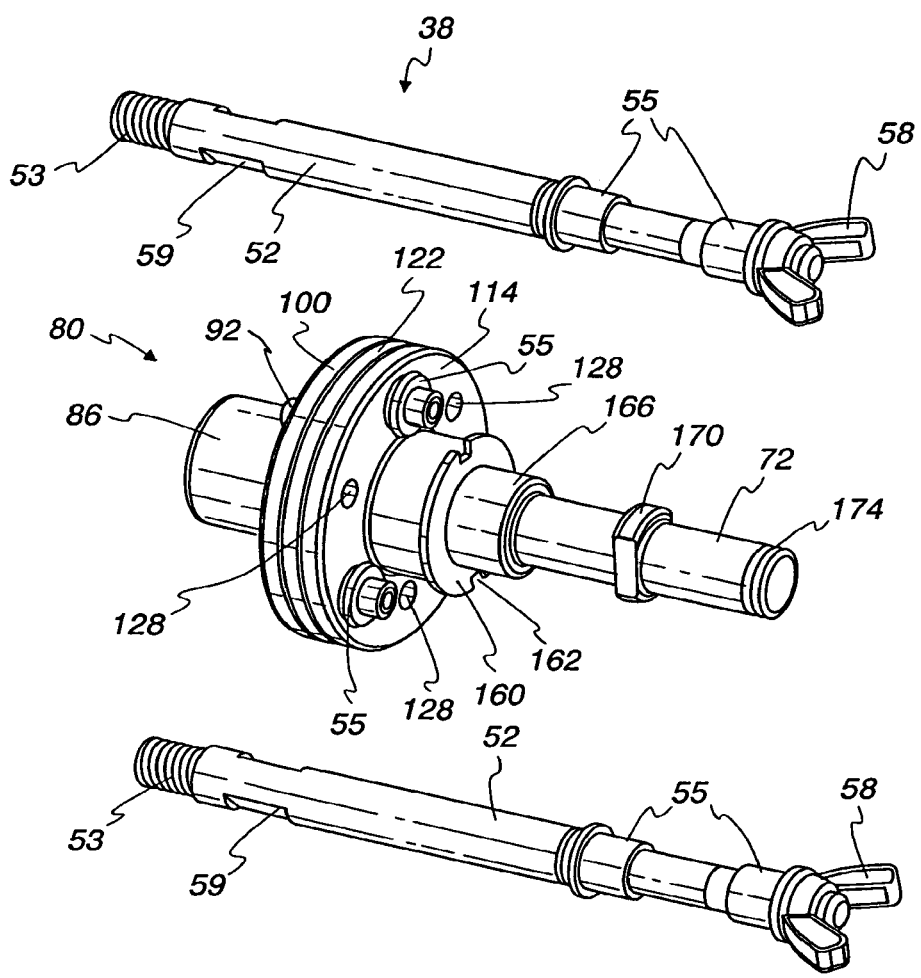
FIG. 4 is an isolated perspective view of a shaft assembly and connectors for use with the present invention.
Figure 5:
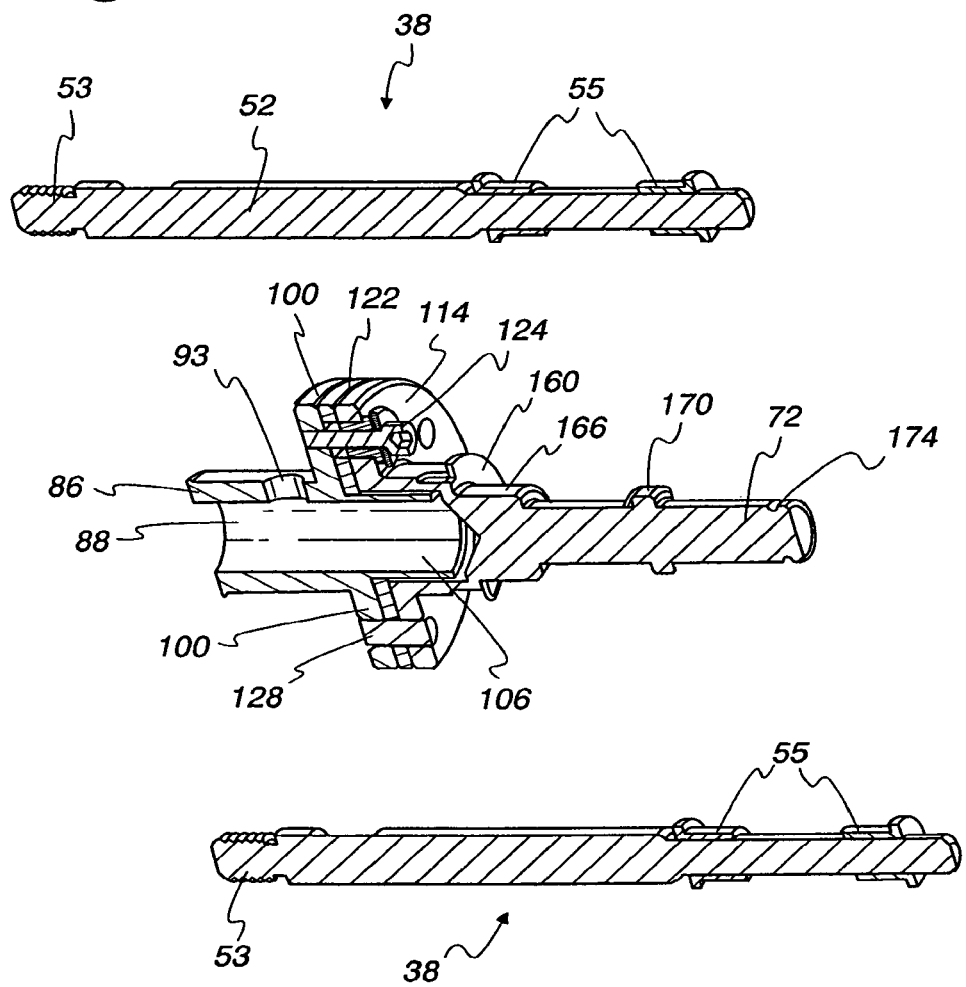
FIG. 5 is a perspective cross-sectional view of the output shaft assembly and connectors of FIG. 4.
Figure 6:
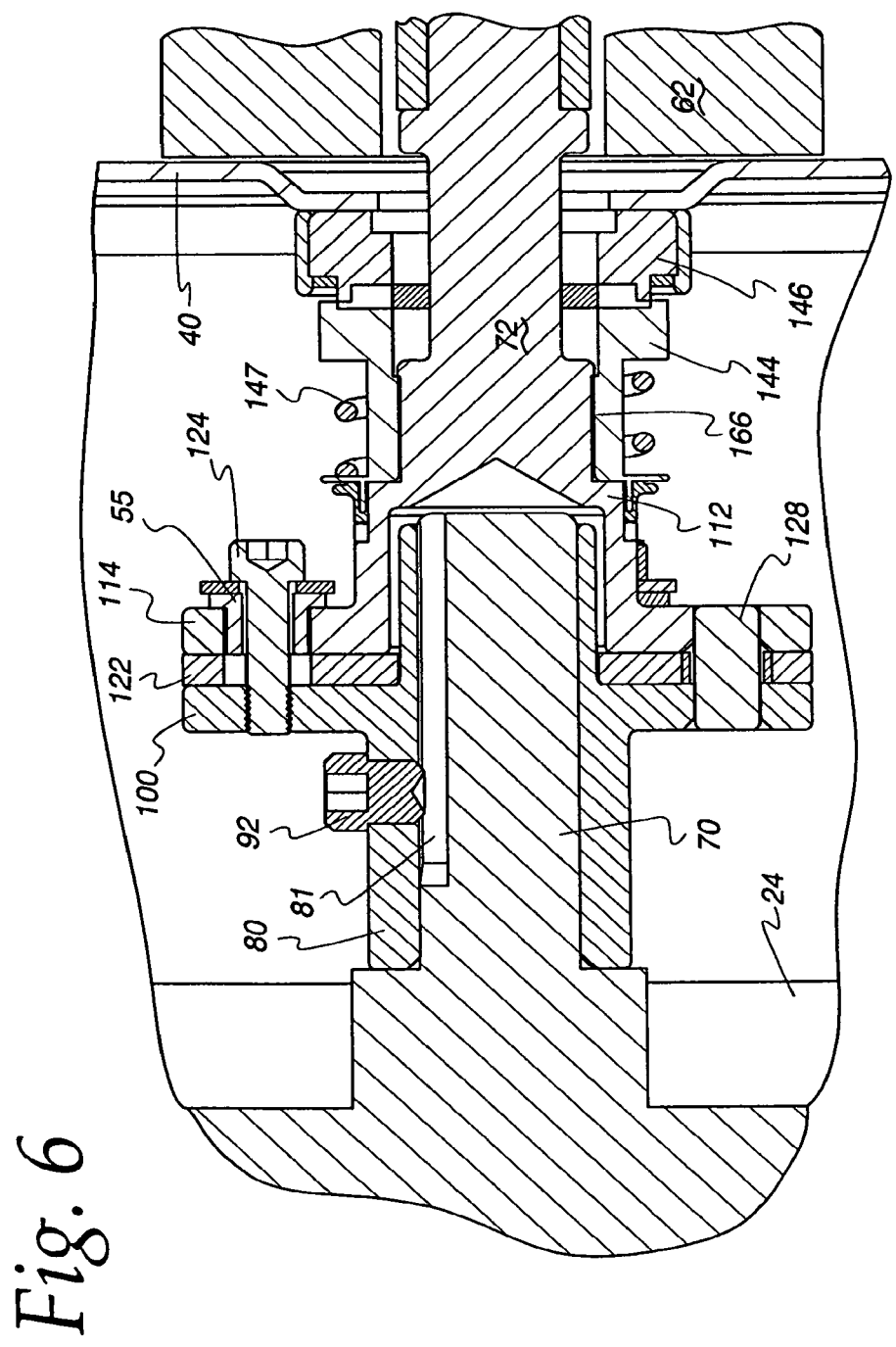
FIG. 6 is a partial cross-sectional view of the output shaft assembly of FIG. 5.
Figure 7:
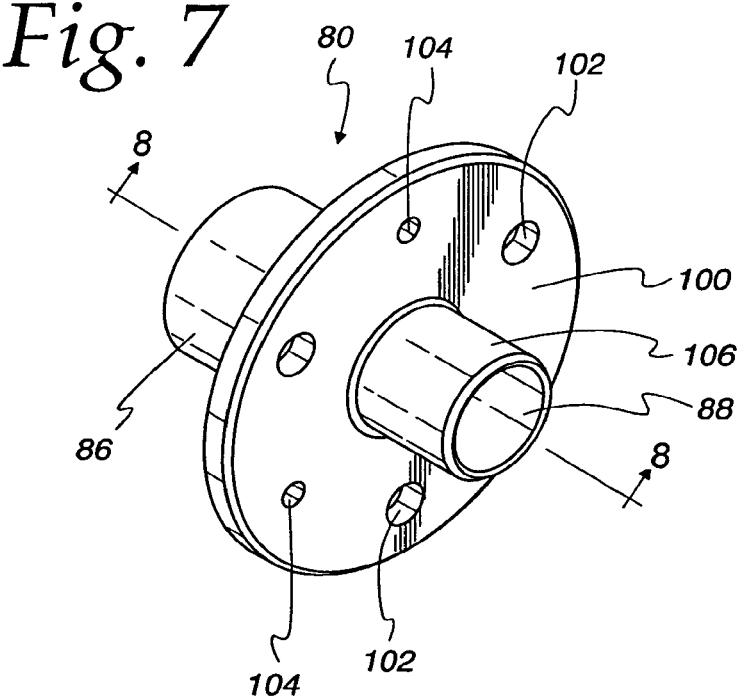
FIG. 7 is a perspective view of a mounting shaft for use in the present invention.
Figure 8:
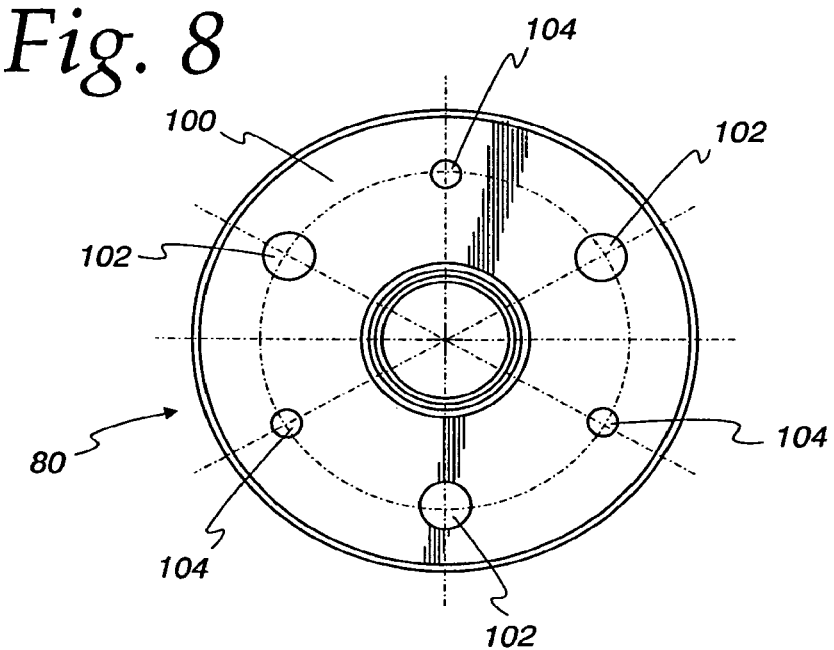
FIG. 8 is an end view of the output shaft of FIG. 4.
Figure 9:
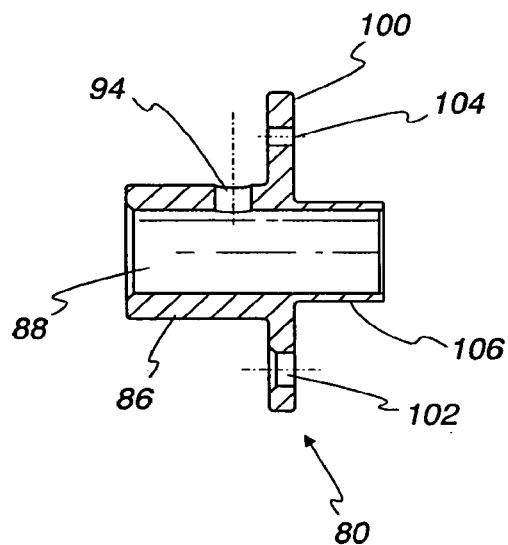
FIG. 9 is a cross-sectional view of the mounting shaft of FIG. 7 taken along line 8-8.

FIGS. 1 through 3 illustrate an embodiment of a milk pump assembly 20 of the present invention having a motor 22, a motor housing 24, a pump 28, and a pump housing 30. The motor 22 and pump 28 are joined by isolation connector assemblies 38 (FIGS. 4 through 6) and cooperate to pump milk from an inlet 34 through an outlet 36 in the pump housing 30. The motor 22 and the pump 28 are separated by a back plate 40 on the pump 28.

The milk pump assembly 20 is mounted to a support of any appropriate construction using a motor mount 42 joined to the motor housing 24. A wiring junction box 44 is also mounted on the motor housing 24 and is connected to an electrical power conductor (not illustrated) with a cord connector 48. The motor 22 can be any suitable type, and the motor 22 and the motor housing 24 are typically made of a conducting metal of suitable and robust construction. An example of an appropriate motor is a ½ horsepower motor, Model No. 191474.00 available from Leeson Electric Corporation located at 2100 Washington Street, P.O. Box 241, Grafton, Wis. 53024-0241.

An isolation connector assembly 38 (FIGS. 4 through 6) preferably include studs 52 that each have a threaded end 53 to thread into a tapped recess 54 (FIG. 2) in the motor housing 24 and at the other end extend through a clamp 56 and are threaded to respective wing nuts 58 or other suitable connector. The studs 52 and wing nuts 58 are separated from the clamp 56 by isolation bushings 55. The studs 52 also secure the back plate 40, but isolation bushings 55 positioned over the studs 52 engage the back plate 40, as best viewed in FIG. 2. Wrench lands 59 are provided on the studs 52 to better enable a wrench to tighten the studs 52 to the motor housing 24.

Figure 13:
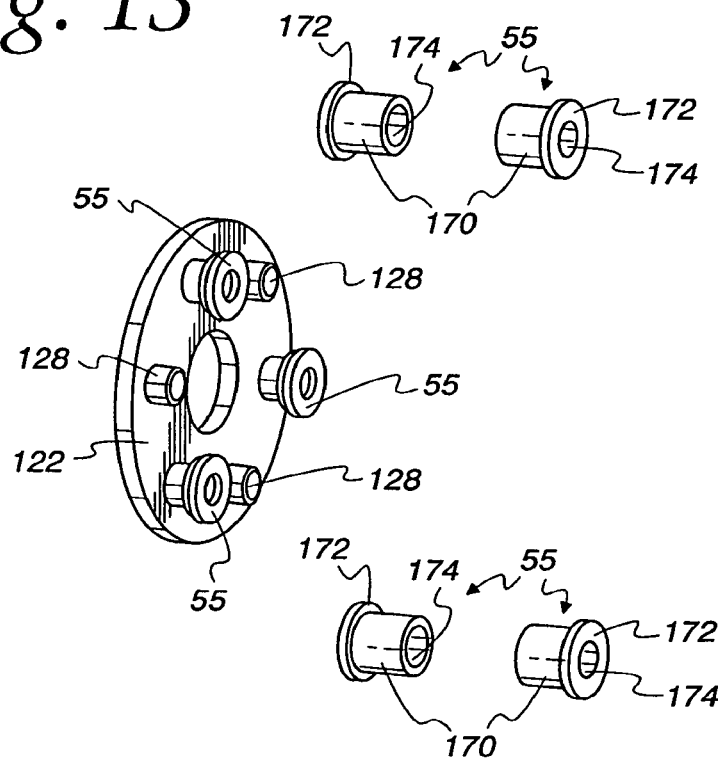
FIG. 13 is a perspective view of the isolation plate of FIG. 12 with isolation bushings and pins.

As illustrated in FIG. 13, the isolation bushings 55 used in the present invention in various sub-assemblies are of different sizes, but preferably include a generally cylindrical portion 170 with a widened seat 172 at one end. The cylindrical portion 170 includes a hole 174 through which a stud, screw, bolt or other connector can extend. Similarly shaped isolation bushings 55 are positioned adjacent to an edge of the back plate 40 to insulate a central portion of the studs 52 from the back plate 40. Other shapes and sizes of isolation bushings 55 can be used in accordance with the present invention. Alternatively, the isolation connector assembly 38 can be or otherwise include an isolation plate 122, related bushings 54, and pins 128, as described in more detail below.

As best viewed near the right side of FIG. 3, the clamp 56 is preferably shaped to fit over and secure the pump housing 30 to the motor housing 24. The pump housing 30 back plate 40 is preferably sealed by a gasket 66 of any suitable shape and material.

As best viewed in FIG. 2, the pump housing 30 generally defines a chamber 60 in which an impeller 62 is disposed. The impeller 62 and the chamber 60 are shaped in a complementary fashion so that the impeller 62 is free to rotate and move an optimum amount of milk from the inlet 34 to the outlet 36. The motor 22 rotates the impeller 62 via a motor output shaft 70 and an impeller shaft 72. In general, the motor rotates the output shaft 70, the impeller shaft 72, and the impeller 62 to pump milk, but when made of conducting materials there is no electrical isolation between the motor 24 and the milk pump 28.

To electrically isolate the motor output shaft 70 from the impeller shaft 72, a mounting shaft 80 (FIGS. 3 to 9) is provided in accordance with the present invention. Generally, the mounting shaft 80 transfers power from the motor 24 to the pump 28, and provides locations for mounting electrical isolation components. As best viewed in FIG. 4 through 9, the mounting shaft 80 includes a first end 86 defining a bore 88 into which the motor output shaft 70 extends. A set screw 92 extends through a tapped hole 93 in the mounting shaft 80 and engages the motor output shaft 70 to secure the mounting shaft 80 to the motor output shaft 70. A key way 81 on the motor output shaft 70 can be formed or machined to be engaged by the set screw 92.

Next to the first end 86 is a flange 100 preferably defining a number of screw or bolt holes 102 and pin holes 104. Next to the flange 100 is a second end 106. The second end 106 of the mounting shaft 80 does not engage the impeller shaft 72, but does provide for alignment during assembly.

Figure 10:
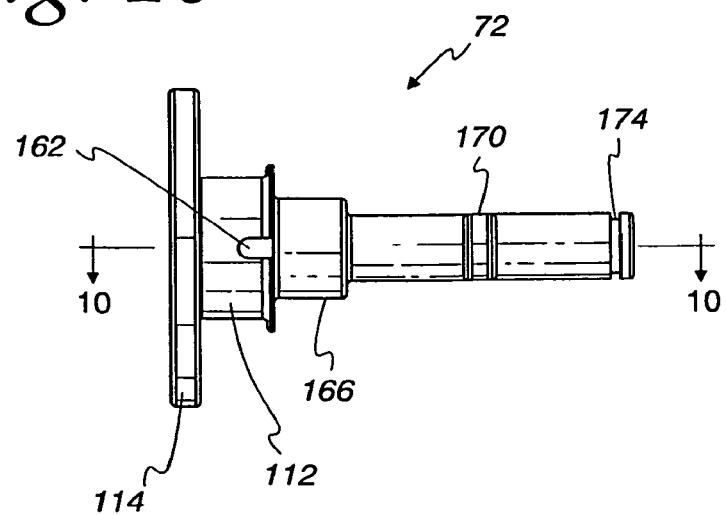
FIG. 10 is a side view of an impeller shaft for use in the present invention.
Figure 11:
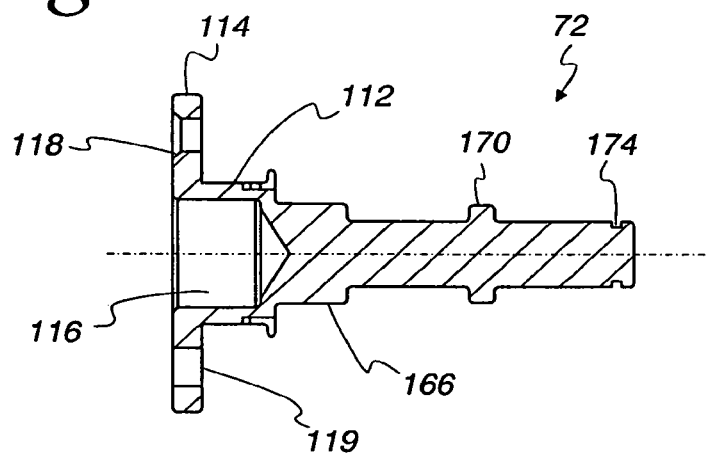
FIG. 11 is a cross-sectional view of the impeller shaft of FIG. 10 taken along line 10-10.

The arrangement of the mounting shaft 80 and the impeller shaft 72 is illustrated in FIGS. 2 through 6, and further details of the impeller shaft 72 are illustrated in FIGS. 10 and 11. The impeller shaft 72 preferably has formed, machined or otherwise joined thereto, an impeller shaft flange 114. In addition, the impeller shaft 72 includes a seal mounting seat 112, a recess 162, and a sealing surface 166.

Referring to FIGS. 4, 5, 6, and 9 through 11, the impeller shaft flange 114 defines a number of bolt or screw holes 118 that mate with the holes 102 in the flanges 100. Bolts or screws 124 can be used to join the flanges 100 and 114 together, although they will be spaced apart by an insulating member, as described below. The impeller shaft flange 114 also includes pin holes 119 that align with pin holes 104 in the mounting shaft flange 100. The pins 128 (see FIG. 13) are preferably made of a suitable dielectric material and are robust enough to transfer the load from the motor 24.

Figure 12:
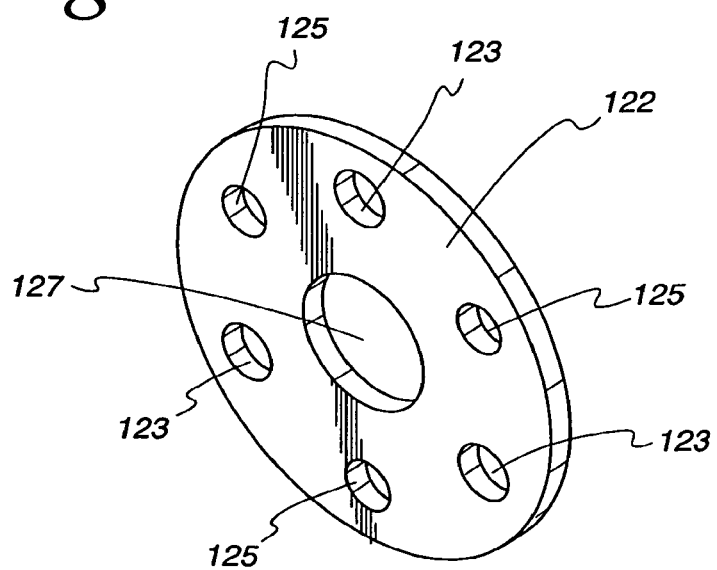
FIG. 12 is a perspective view of an isolation plate for use in the present invention.

An electrical isolation plate 122 is disposed between the mounting shaft 80 and the impeller shaft 72 to electrically isolate the mounting shaft 80 and the impeller shaft 72 from one another. In one embodiment, the respective flanges 100 and 114 are aligned with and have disposed between them the isolation plate 122 (FIGS. 12 and 13). Matching bolt or screw holes 123 and pin holes 125 are formed or machined in the isolation plate 122. A central hole 127 receives the mounting shaft 80.

The screws 124 that join the flanges 100 and 114 are preferably threaded into the mounting shaft flange 100 and are spaced apart and electrically insulated from the impeller shaft flange 114 by isolation bushings 55 (FIG. 13). These isolation bushings 55 are preferably shaped as described above, but are sized to match the screws 124 and to extend through screw holes 118. (FIG. 11.) In addition, the isolation pins 128 (FIG. 13) are disposed in mating pin holes 104 and 118 of the flanges 100 and 114 and the pin holes 125 the isolation plate 122. Washers 130 (FIG. 3) can also be used. In this manner, the mounting shaft 80 and the impeller shaft 72 are electrically insulated from one another. The described isolation components are the preferred sizes, shapes, and function, but other isolation components are within the scope of the present invention.

A spacer 166 (FIGS. 2 and 3) is disposed between the motor 22 and the pump 28 to provide stability to the milk pump assembly 20 due to the addition of the electrical isolation components that typically lengthen the milk pump assembly 20. If the milk pump assembly 20 is not lengthened, there is no need for a spacer. Nonetheless, in most embodiments, the addition of a mounting shaft 80 and other isolation components requires the spacer 166, which is preferably cylindrically shaped and includes a drain hole and plug 168. The spacer 166 also preferably serves to isolate and to protect the pump components from a harsh dairy environment.

Referring to FIGS. 4, 5, 6, 10, and 11, the impeller shaft 72 also includes a seal mounting seat 112 adjacent to the flange 114. A pair of recesses 162 on opposite sides of the seal mounting seat 160 provide a secure connection point for tabs on a resilient seal 144, described below.

Next to the seal mounting seat 160 is the sealing surface 166 for mating with the resilient seal 144 to substantially seal the pump housing chamber 60 so that no milk can leak into the area where the motor 22 is located. The relative diameters of the seal attachment portion 160 and the sealing surface 166 are illustrated in FIGS. 4, 6, 10, and 11, and are sized to mate with the resilient seal 144. Other seal types and impeller shaft configurations are within the scope of the present invention.

The impeller shaft 72 also includes a power transfer key 170 that fits into a mating bore (not illustrated) in the impeller 62 to transfer torque from the impeller shaft 72 to the impeller 62. The impeller 62 is retained on the impeller shaft 72 by a clip 173 (FIG. 3) that engages a groove 174 near the end of the impeller shaft 72.

The seal components referenced above are illustrated in FIG. 3, between the motor housing 24 and the pump housing 30, and around the impeller shaft 72. The seal components include a shim 142, a resilient seal 144, and a seal cup 146 that cooperate with the seal mounting seat 112 and the sealing surface 116 on the impeller shaft 72 to prevent or reduce milk leakage from the pump housing 30 into the motor housing 24. The resilient seal 144 is preferably a spring 147 biased element to maintain consistent sealing pressure, accommodate vibration, and minimize wear of pump components. A suitable resilient seal 144 (Part No. 16-075-188) and a matching seal cup 146 (Pac-Seal—Part No. 08-1601) are available from Flowserve Inc. located at 5215 N. O'Connor Blvd., Suite 2300, Irving, Tex. 75039. Other seal types are within the scope of the invention.

The shim 142 bears on the seal mounting seat 112 of the impeller shaft 72, the resilient seal 144 bears on the shim 142, and the seal seat cup 146 is inserted into a bore in the resilient seal 144.

Many motor and pump components are made of a conductive metal, through which electrical current could flow in the event of equipment failure. The invention prevents electric current from flowing from the motor 22 to the pump 28 with isolation components at all points of contact between these two primary components. As described above, the insulation components include isolation bushings 55, the isolation plate 122, the pins 128 and preferably, an isolation spacer 166. All of these are made of any suitable non-conducting material, and preferably the material is Delrin® or nylon. The isolation components are also sized and shaped to transfer any related loads and withstand a dairy environment.

The various electrically insulating components of the present invention are best viewed in FIGS. 4, 5, 6, 12, and 13. In new milk pumps, these electric insulators can be installed when the milk pump components are being assembled. In such cases, multiple components can be manufactured together into fewer components than are described herein.

In other situations, an existing milk pump can be retrofitted with electrical isolation components, such as those described above. The electrical isolation components and the output shaft 70 can be sold as a kit with appropriate instructions for retrofitting existing milk pumps. Individual milk pump brands and styles may require custom shapes and sizes of isolation components, but a majority of milk pumps can be accommodated with a few relatively generic sets of isolation components.

The isolation kit preferably provides parts and instructions that are simple enough to be installed by trained service technicians. In addition to the isolation components, new and extended connectors 52 can be provided in the kit to accommodate additional spacing between the motor 22 and the pump 28 resulting from the addition of the isolation components.

The kit instructions describe how to insert a mounting shaft 80 between a motor output shaft 70 and a modified impeller shaft 72. The mounting shaft 80 can be joined to the pump output shaft 70 with set screws, keys or other suitable connectors that are provided in the kit. An included impeller shaft 72 preferably replaces a standard impeller shaft.

A preferred electrically isolated milk pump in accordance with the present invention is incorporated into a milk pasteurizer under the brand name UV Pure Milk Pasteurizer, Part No. 7750-0118-428, available from GEA Farm Technologies, Inc. located at 1880 Country Farm Drive, Naperville, Ill. 60563, USA, or from its distributors and dealers.

The foregoing description is provided for clearness of understanding only and no necessary limitations therefrom should be read into the following claims, as alternate embodiments are intended to be within the scope of this invention.

The invention claimed is:

1. A milk pump assembly comprising:
   a motor;
   a back plate joined to and spaced apart from the motor to at least partially define a motor space;
   a motor output shaft operatively engaged with the motor;
   a mounting shaft flange disposed in the motor space, and operatively engaged with the motor output shaft;
   an electrical isolation plate disposed in the motor space, and having a first face and a second face, and the first face is engaged with the mounting shaft flange;
   a milk pump impeller shaft disposed in the motor space, and including an impeller shaft flange engaged with the second face of the electrical isolation plate and spaced apart and electrically disengaged from the mounting shaft flange by the electrical isolation plate;
   a seal assembly disposed in the motor space, and in engagement with the milk pump impeller shaft to substantially prevent milk from entering the motor space;
   a milk pump impeller operatively engaged with the milk pump impeller shaft and disposed on an opposite side of the back plate from the motor space;
   a milk pump housing wherein the milk pump housing is joined to the motor; and
   an electrical isolation component disposed between the milk pump housing and the motor.

2. The milk pump assembly of claim 1, wherein the seal assembly is disposed on an opposite side of the back plate from the milk pump impeller.

3. The milk pump assembly of claim 1, and further comprising:
a plurality of connectors joining the mounting shaft flange, the electrical isolation plate and the impeller shaft flange, and the connectors are disposed in the motor space.

4. The milk pump assembly of claim 1, and further comprising:
a plurality of connectors joining the mounting shaft flange, the electrical isolation plate and the impeller shaft flange, and the connectors are disposed in the motor space; and
a plurality of electrical isolation bushings, and each electrical isolation bushing is disposed between one of the connectors and the impeller shaft flange.

5. The milk pump assembly of claim 1, and further comprising:
a housing connector for joining the milk pump housing to the motor.

6. The milk pump assembly of claim 1, and further comprising:
an electrical isolation alignment pin engaged with the mounting shaft flange and the impeller shaft flange.

7. A milk pump assembly comprising:
a motor;
a back plate joined to the motor to at least partially define a motor space;
a mounting shaft flange disposed in the motor space, and operatively engaged with the motor;
an electrical isolation plate disposed in the motor space, and having a first face in contact with the mounting shaft flange, and a second face;
a milk pump having an impeller disposed on an opposite side of the back plate from the motor space, a milk pump impeller shaft joined to the impeller, and a milk pump impeller shaft flange is disposed in the motor space, and joined to the milk pump impeller shaft and in contact with the second face of the electrical isolation plate, and the milk pump impeller shaft flange is spaced apart and electrically disengaged from the mounting shaft flange by the electrical isolation plate;
a seal assembly disposed in the motor space and engaged with the back plate to prevent milk from entering the motor space; and
an electrical isolation component disposed between the motor and the milk pump housing to at least partially define the motor space.

8. The milk pump assembly of claim 7, wherein the motor space is sealed.

9. The milk pump assembly of claim 7, and further comprising:
a plurality of connectors joining the mounting shaft flange, the electrical isolation plate, and the impeller shaft flange.

10. The milk pump assembly of claim 7, and further comprising:
a plurality of connectors joining the mounting shaft flange, the electrical isolation plate and the impeller shaft flange, and the connectors are disposed in the motor space; and
a plurality of electrical isolation bushings, and each electrical isolation bushing is disposed between one of the connectors and the impeller shaft flange, and in the motor space.

11. The milk pump assembly of claim 7, and further comprising:
a motor output shaft joined to the motor and the mounting shaft flange.

12. The milk pump assembly of claim 7, wherein the electrical isolation plate has a diameter that is substantially the same as a diameter of the mounting shaft flange.

13. The milk pump assembly of claim 7, and wherein the electrical isolation component comprises:
a plurality of isolation bushings.

* * * * *